United States Patent [19]
Jones

[11] Patent Number: 4,630,903
[45] Date of Patent: Dec. 23, 1986

[54] EYEGUARDS

[75] Inventor: Richard I. Jones, Clwyd, Wales

[73] Assignee: Pilkington P.E. Limited, United Kingdom

[21] Appl. No.: 675,938

[22] Filed: Nov. 28, 1984

[30] Foreign Application Priority Data

Dec. 7, 1983 [GB] United Kingdom ............... 8332701

[51] Int. Cl.⁴ ............................................. G02B 23/16
[52] U.S. Cl. ................................................... 350/579
[58] Field of Search ......................................... 350/579

[56] References Cited

U.S. PATENT DOCUMENTS 3,669,523  6/1972  Edwards, Jr. ...................... 350/57
4,264,123  4/1981  Mabie ................................ 350/579

FOREIGN PATENT DOCUMENTS 098989   1/1984  European Pat. Off. .
1264324  4/1968  United Kingdom .

*Primary Examiner*—Jon W. Henry
*Assistant Examiner*—Vincent J. Lemmo
*Attorney, Agent, or Firm*—F. Eugene Davis, IV; Mark P. Stone

[57] ABSTRACT

An eyeguard for a low light level or night vision rifle sight which does not rely on uniform axial pressure for proper opening comprises a moulded rubber body having a front portion which fits on the viewing end of the sight, a back cup portion angled with respect to the front portion, and a middle thin walled deformable portion to which a single flap is secured. The flap is biased towards a closed position by the resilience of the body but is opened by angular pressure applied by an observer's eye socket to the cup portion.

12 Claims, 2 Drawing Figures

EYEGUARDS

BACKGROUND OF THE INVENTION

This invention concerns improvements in or relating to eyeguards and particularly eyeguards for use with low light level or night vision sights.

A low light level or night vision sight, sometimes referred to as a sighting telescope, has internal illuminating means which provide an observer with a visible image of sufficient brightness for satisfactory viewing. Typically such a sight or telescope comprises an objective lens which focuses such light as is received from a scene or object under low light level conditions onto the photocathode of an image intensifier tube, and an eyepiece or magnifier lens through which an observer views the image of intensified brightness formed on the phosphor of the image intensifier. It is common practice to provide a resilient, usually rubber, eyeguard, sometimes referred to as an eyecup, at the interface of the user's eye area and the eyepiece end of the sight. Such eyeguard provides a relatively comfortable cushion for locating the eye relatively to the sight and setting back the focal distance of the eye with respect to the optical system. The eyeguard may also be adapted to absorb, and hence protect the user's face from the effects of, recoil of a weapon on which the sight is mounted.

Additionally the eyeguard for a low light level or night vision sight usually contains self-closing flaps which block the viewing opening or aperture when the user is not observing through it. Such flaps prevent the escape of light emitted by the internal illuminating means, i.e. usually the image intensifier tube phosphor, when it is switched on but not actually being viewed. Such escape of light is generally undesirable under low light level conditions, and in a military situation at night can be dangerous in that the escaping light may be seen by the enemy.

Generally two overlapping flaps are provided which move from their closed to their open positions by axial deformation of at least a portion of the eyeguard resulting from axial pressure applied by the user's face, in practice by the bony area surrounding the eye viewing through the aperture. On release of such pressure by removal of the face from the eyeguard the collapsible portion expands axially again and returns the flaps to their closed position. An example of an axially actuated two flap system is disclosed in United Kingdom Patent Specification No. 1,264,324.

Axially actuated two flap systems have been found to work well when the applied axial pressure deforms the whole of the collapsible portion of the eyeguard uniformly. This can usually be achieved fairly easily with a hand-held surveillance night sight since the user can readily present the sight to his eye with the sight and eyeguard axis normal to the eye socket, thus ensuring the application of substantially uniform axial pressure round the eyecup. However, this is difficult if not impossible to achieve with, for example, a rifle mounted night sight where the rifle butt constitutes an obstruction and the general firing posture is not well adapted to the facial application of axial pressure uniformly to the eyecup. The angular disparity between the sight and eyeguard axis and the eye socket tends to lead to uneven deformation of the eyeguard and hence only partial opening of one or both flaps. As a result the field of view seen by the eye can be seriously impaired.

SUMMARY OF THE INVENTION

According to the present invention there is provided an eyeguard having an opening or aperture through which an observer views and closure means urged or biased towards a closed position at which it blocks the opening or aperture, the eyeguard being angularly deformable to move the closure means from its closed position to an open position which clears the opening or aperture. With such an eyeguard the application of angular pressure by the face of an observer, and specifically by the bony area round the eye socket, causes angular deformation so as to clear the opening or aperture and permit viewing therethrough. Preferably the closure means comprises a single flap.

More particularly the eyeguard may have an angularly moveable cup portion against which the observer's face can bear to effect deformation which moves the closure means from the closed to its open position. The cup portion axis in the closed position can be angled with respect to the axis of the sight or other viewing device with which the eyeguard is used and angular movement of the cup portion can move its axis towards alignment with the sight or other viewing device axis. The eyeguard may comprise a front portion having an axis corresponding to the axis of the sight or other device and relatively to which the axis of the cup portion is angled in the closed position, the cup portion being angularly moveable to move its axis towards alignment with the forward portion axis to move the closure means from its closed to its open position. The front portion of the eyeguard may be adapted to interface with, and more particularly to fit onto, the viewing end of the sight or other device with which the eyeguard is used. The eyeguard can be orientated to a suitable positional relationship with respect to the required face location and orientation by rotation about the axis of the sight or other viewing device.

Preferably the cup portion is connected to the front portion by a deformable portion to which the closure means is secured. In particular a single flap constituting the closure means may be secured by a foot to the deformable portion. Conveniently the said portions are part of a single body moulded from deformable material, such as rubber, the said deformable portion being provided by a thin walled part. The forward portion may include a convolution to absorb recoil, and the cup portion may be shaped to provide a cushioning rim for the observer's eye socket. The closure means, and in particular the preferred single flap, can be urged or biased towards the closed position by the resilience of the material, the natural or undeformed moulded shape being such as to hold that position.

The invention further provides the combination of an eyeguard as set forth above with a low light level or night vision sight, and more particularly with a low light level or night vision rifle sight.

BRIEF DESCRIPTION OF THE DRAWINGS

A preferred embodiment of apparatus in accordance with the invention will now be described, by way of example, with reference to the accompanying drawings, in which.

DETAILED DESCRIPTION

Figure 1:
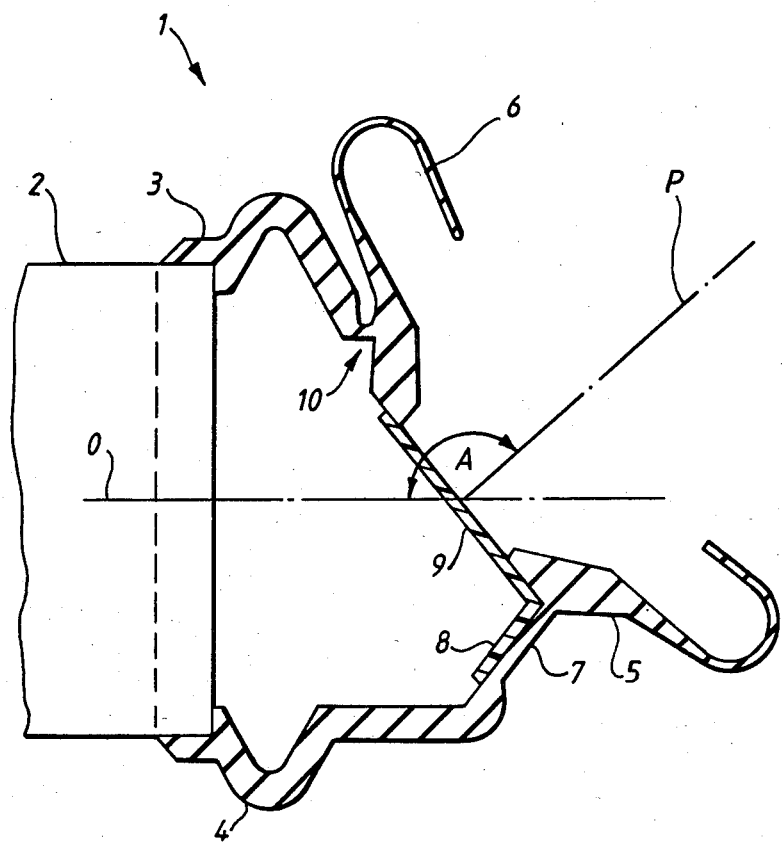
FIG. 1 is a schematic axial section.

FIG. 1 schematically shows an eyeguard 1 mounted at the eyepiece or viewing end 2 of a night vision sight having an optical axis 0.

The eyeguard 1 comprises a body moulded from resilient material, such as rubber, having a forward part or front portion 3 adapted to interface with, and in particular fit onto, the end 2 of the sight. This front portion 3 is annular around an axis corresponding to, i.e. which when the eyeguard is fitted coincides with, the optical axis 0 of the sight. It includes a convolution 4 of concertina form which can absorb weapon recoil when the sight is mounted on a weapon which is fired, such as a rifle.

The eyeguard body portion has a back part constituting a cup portion 5 which is generally annular about an axis P that, in the rest or closed postion shown in FIG. 1, is inclined to the sight and front portion axis 0, the obtuse angle between the axes being indicated as A. This cup portion 5 defines at its forward end a central opening or aperture through which (when open) the eye of an observer can view and is shaped at its rearward end it provide a cushioning rim 6 against which the observer's eye socket can bear.

Figure 2:
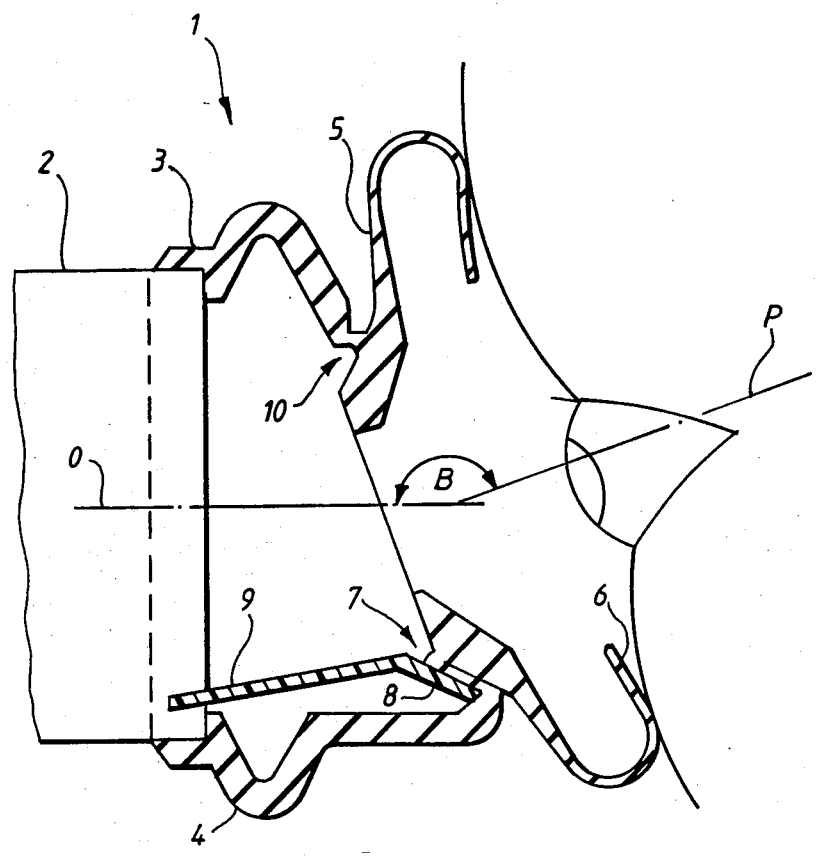
FIG. 2 is a view similar to FIG. 1 but with parts in a different position.

The cup portion 5 is connected to the front portion 3 by a deformable portion 7, this part of the body being preferentially deformable by reason of having a thinner wall than the less deformable parts forward and rearward of it. Secured, e.g. by suitable adhesive, to the deformable portion 7 is a foot 8 of a resilient flap member 9 which provides a single closure flap for the eyeguard. In the rest or closed position shown in FIG. 1 the flap 9 covers the central opening or aperture since it is urged or biased against the forward end of the cup portion 5 by the resilience of the eyeguard material, the natural or undeformed moulded shape of the body being such as to hold it in that position. However, angular pressure applied to the rim 6 of the cup portion 5, i.e. pressure applied at an angle to the axis 0 so as to cause angular deformation of the eyeguard such as to urge the cup axis P towards alignment with the forward portion and sight optical axis 0, i.e. so as to increase the angle A, produces distortion of the deformable portion 7 in a manner which causes the flap 9 to move away from the cup portion 5 to clear the central opening or aperture. FIG. 2 shows the eyeguard in the open or 'in use' position with the flap 9 away from the cup portion 5, which has moved angularly (effectively by pivoting about a position 10) so that the axis P is at an obtuse angle B (greater than A) to the axis 0.

The manner of operation of the eyeguard in use will be largely apparent from the foregoing. In the rest or closed position (FIG. 1) the flap 9 blocks the central opening or aperture so as to prevent escape therethrough of light emitted by the internal illuminating means of the sight when switched on. When the user applies his eye socket to the rim 6 of the cup portion 5 and exerts pressure (in practice by the bony area around the eye socket) generally in the direction of the axis P, this displaces the angularly moveable cup portion 5 and thus causes angular deformation of the eyeguard to move the flap 9 to its open position shown in FIG. 2. In the open or 'in use' position with the flap 9 clear of the central opening or aperture, the user's eye can view therethrough in a direction generally along the optical axis 0 and can thus see the visual display of the sight. In this position the observer's face against the cup rim 6 itself blocks the eyeguard against escape of light. The observer's view through the sight is maintained so long as the facial pressure is applied and the flap 9 thereby held open. If the sight is weapon mounted, particularly on a rifle, and the weapon is fired while the observer is viewing through the sight, the convolution 4 absorbs recoil and reduces its transmission to the observer's face. On completion of viewing the observer releases the facially applied angular pressure by retracting his face from the eyeguard which, by its resilience, then reverts to the rest or closed position with the flap 9 held shut so as to block the central opening or aperture.

The eyeguard 1 can be rotated about the axis 0 with respect to the sight so as to orientate it as required relatively to the user's facial position and orientation, and in particular to orientate the axis P with the desired direction of application of facial pressure so as to ensure that the required eyeguard deformation occurs.

It will be appreciated that actuation by angular, as distinct from axial, deformation of the eyeguard can have particular advantages with the general posture which is usually adopted when sighting and firing a rifle, and an eyeguard as described above is therefore especially useful in combination with a low light level or night vision rifle sight. It can, however, usefully be employed in combination with other types of sight or viewing device which would usually, but not necessarily, be of a low light level or night vision nature having some form of internal illuminating means whose emitted light is to be prevented from escaping. The sight or viewing device need not necessarily be responsive to incident visible light but could, for example, be responsive to infra-red or other radiation and include a convertor which produces a visible image for viewing by the observer.

It will further be appreciated that the preferred embodiment shown and described is given by way of illustration and example and various alternatives and modifications thereto which do not depart from the scope of the invention may be apparent to those skilled in the art.

I claim:

1. An eyeguard comprising a moulded body of deformable material, the body having a front portion adapted to fit onto the viewing end of a device with which the eyeguard is used, a cup portion, and a deformable portion connecting the cup portion to said front portion, said cup portion being urged or biased towards an inclined position at which its axis is inclined relative to the front portion axis, and said deformable portion permitting angular movement of the cup portion relative to said front portion, the eyeguard further having a single closure flap secured to said deformable portion and moveable between a closed position and an open position on angular movement from said inclined position of said cup portion relative to said front portion.

2. An eyeguard having an opening or aperture through which an observer views when the eyeguard is being used and closure means urged or biased towards a closed position at which it blocks the opening or aperture, the eyeguard having adjacent the opening or aperture an angularly movable part with a central axis which is inclined relative to the optical axis of the eyeguard when the eyeguard is not being used, the eyeguard being deformable to move the closure means from its closed position to an open position when the central axis of the angularly moveable part is moved towards alignment with the optical axis of the eyeguard.

3. An eyeguard according to claim 2 in which the closure means consists of a single flap.

4. A low light level or night vision sight with an eyeguard according to claim 2.

5. A low light level or night vision rifle sight with an eyeguard according to claim 2.

6. An eyeguard according to claim 2 having an angularly moveable cup portion against which the observer's face can bear to effect deformation which moves the closure means from its closed to its open position.

7. An eyeguard according to claim 6 in which the cup portion is shaped to provide a cushioning rim for the observer's eye socket.

8. An eyeguard according to claim 6 comprising a front portion having an axis corresponding to the axis of the sight or other device with which the eyeguard is used and relatively to which the axis of the cup portion is angled in the closed position, the cup portion being angularly moveable to move its axis towards alignment with the front portion axis to move the closure means from its closed to its open position.

9. An eyeguard according to claim 8 in which the front portion includes a convolution to absorb recoil.

10. An eyeguard according to claim 8 in which the cup portion is connected to the front portion by a deformable portion to which the closure means is secured.

11. An eyeguard according to claim 10 in which said portions are parts of a single body moulded from deformable material, the said deformable portion being provided by a thin walled part.

12. An eyeguard according to claim 10 in which the closure means comprises a single flap secured by a foot to said deformable portion.

* * * * *